(12) United States Patent
Tews et al.

(10) Patent No.: US 8,641,854 B2
(45) Date of Patent: Feb. 4, 2014

(54) POLYPROPYLENE FILM FOR ELECTRON-BEAM HARDENING APPLICATIONS

(75) Inventors: Wilfrid Tews, Bechhofen (DE); Maria Heck, Bildstock (DE)

(73) Assignee: Treofan Germany GmbH & Co. KG (DE)

( * ) Notice: Subject to any disclaimer, the term of this patent is extended or adjusted under 35 U.S.C. 154(b) by 250 days.

(21) Appl. No.: 11/914,573

(22) PCT Filed: May 17, 2006

(86) PCT No.: PCT/EP2006/062395
§ 371 (c)(1),
(2), (4) Date: Nov. 16, 2007

(87) PCT Pub. No.: WO2006/122958
PCT Pub. Date: Nov. 23, 2006

(65) Prior Publication Data
US 2008/0213563 A1 Sep. 4, 2008

(30) Foreign Application Priority Data

May 18, 2005 (DE) .......................... 10 2005 023 568

(51) Int. Cl.
*B32B 37/06* (2006.01)
(52) U.S. Cl.
USPC ..................................................... 156/272.2
(58) Field of Classification Search
USPC ........................................... 156/272.2, 275.5
See application file for complete search history.

(56) References Cited

U.S. PATENT DOCUMENTS

| 4,758,462 A | * | 7/1988 | Park et al. ..................... 428/213 |
| 5,498,474 A | | 3/1996 | Schuhmann et al. |
| 5,997,968 A | | 12/1999 | Dries et al. |
| 2005/0003155 A1 | * | 1/2005 | Huffer .......................... 428/141 |

FOREIGN PATENT DOCUMENTS

| DE | 3513526 A | * | 10/1986 |
| DE | 3801535 A1 | | 7/1988 |
| EP | 0236714 A2 | | 9/1987 |
| EP | 0623463 A1 | | 11/1994 |
| EP | 0695777 A1 | | 2/1996 |
| EP | 0781652 A2 | | 7/1997 |
| GB | 2201407 A1 | | 9/1988 |
| JP | 57131555 A | * | 8/1982 |

OTHER PUBLICATIONS

Machine Translation of DE 3513526 A, Apr. 23, 2010.*

* cited by examiner

*Primary Examiner* — Daniel McNally
(74) *Attorney, Agent, or Firm* — Novak Druce Connolly Bove + Quigg LLP

(57) ABSTRACT

The invention relates to a Co-extruded, multilayer and biaxially-oriented polypropylene film, which comprises of at least one first sealable covering layer and at least one vacuolate layer, having a thickness of at least 5 μm, is further treated by laminating, pasting, printing, varnishing and/or coating; the result registered as follows: after drying or hardening during further treatments using electron-beam irradiation, the vacuolate layer has a thickness of at least 5 μm. Hot tack is not damaged by electron-beam processing.

6 Claims, No Drawings

POLYPROPYLENE FILM FOR ELECTRON-BEAM HARDENING APPLICATIONS

RELATED APPLICATIONS

This application is a national stage application (under 35 U.S.C. §371) of PCT/EP2006/062395, filed May 17, 2006, which claims benefit of German application 10 2005 023 568.9, filed May 18, 2005.

Invention relates to an application of an opaque polypropylene film.

Biaxial polypropylene films (PP) are currently used in different industries for packaging. The advantages for the use of polypropylene films are as follows: high transparency, shine, water vapour protection, good printability, rigidity, resistance to piercing, etc. The development of opaque films alongside the transparent films has been very successful during the last years. Firstly, exceptional optical features (whiteness and opacity) of these films are particularly desirable for some applications. Secondly, the opaque films offer higher outputs because of their reduced density.

Despite this variety of beneficial properties the polypropylene film must be often combined with other materials in order to compensate for certain deficiencies. Various characteristics required for many applications could not be all implemented in one film. For this reason different film types are often joined together into a so called 'laminate'. Glues or primers are used for laminating to assure secure bonding of laminated films to each other.

Also in order to assure the required performance characteristics, surface coating or varnishing of base film is often applied. Coatings, for example, improve scratch resistance, shine or protective characteristics of films and provide better or other sealing properties, for example, cold sealing.

Printing of the base film is essential for the improvement of the film for packaging. There are many printing methods being used. In some applications the print must be protected by means of laminating or varnishing against a transparent film, as a result of which, where appropriate, the contact between the printing ink and the goods inside the packet is prohibited.

It is essential to ensure a good bonding between different materials during treatment stages such as laminating, lining, coating, printing, layering. Therefore, there are different technologies and auxiliary materials being used by various treatment methods designed to improve the bonding. For example, glue is required for laminating or lining and a primer is often applied before coating. After varnish or print layer has been applied it is necessary to let this varnish or print layer dry or cross-link. The same refers to the glue and primer layers.

Base film and the treatment method must be coordinated so that the improvement procedure results in packaging that complies with highest optical and technical requirements.

New methods such as, for example, UV and Electron Beam Hardening were recently developed for hardening and drying of printing ink, varnish and glue layers. UV Hardening is a photochemical process where by means of photo initiators and under influence of UV light printing inks and binding materials develop a dry tight colour film within seconds. Unlike conventional systems there is no evaporation of solvents or diluters. All components participate in the reaction. Therefore UV Hardening is a very clean technology.

As an alternative, there is also a method where hardening or drying of layers is initiated by means of electrons, the so called electron-beam hardening (ESH). This method offers new possibilities for hardening or drying of solvent free printing inks, coatings, varnishes or laminating glues which do not contain photo initiators. Method opens new opportunities in the field of flexo and offset printing inks as an alternative to water and UV printing inks, as well as hardening of re-varnished layers, which can partially substitute glazed lamination.

Energy of electrons can vary during Electron Beam Hardening (ESH), determining the penetration depth into the material and the thickness of the layer that could be hardened or dried. The problem in ESH method is caused by undesirable interaction with the base material. In general, during irradiation it is not possible to accurately control the penetration depth of electrons so as to completely prevent the penetration of electrons into the base material. Thereby it can lead to polymer mesh reactions in the base material which sometimes results in yellowing, blistering or loss of strength properties.

Similar negative interactions between high energy radiation and performance characteristics are also known in the field of PP films. To increase surface tension the film surface is irradiated with ions, which create the environment through electrical discharge (corona treatment) or flame ionisation. Direct influence to polymer film layers often occurs. Furthermore, interactions between additives, polymers. and irradiation also influence film properties. For example, it is known that flame treatment method causes bad damage to the heat sealing properties of PP films. Issues of corona irradiations negative interaction on films containing silicon oil belong to general technical knowledge. Likewise, polymer mesh reactions result in the loss of hot-tack heat sealing properties of the film.

It is also known that electron beam treatments severely damage hot-tack property of PP films. Hot-tack property of films is one of the most important properties when the film is used on the vertical filler-sealer machine (VFFS). Unfortunately, in parts hot-tack properties are so badly damaged after electron-beam hardening (ESH) that it is not possible to use the film on the vertical filler-sealer machines (VFFS) any more. To solve this problem there were trials carried out with electrons of lower energy or smaller doses of exposure in the prior art. There is also an alternative to look for new or stabilised sealing materials which are not influenced by electron beam. (I. Rangwalla ESI US Wilmington Influence of Electron Beam on some Polymeric Substrates used in Flexible Packaging. Munich $29^{th}$ symposium on adhesive substances and improvements, 2004; S. 113-116)

Task of this invention was therefore to provide the film material that could be introduced into electron beam method for drying or hardening of additional layers without damaging important performance characteristics of base materials. In particular, the sealing film laminated or printed and dried or hardened by electron beam irradiation, should remain usable for hot tack applications.

The underlying task of this invention is solved by application of coextruded, multilayer and biaxially-oriented polypropylene multilayer film, which comprises at least one first sealable outer layer and at least one vacuolate layer having a thickness of at least 5 μm, whereby said film is manufactured from coextruded layers by laminating, pasting, printing, varnishing and/or coating.

Film layer containing vacuoles is generally a base layer or intermediate layer of the film. If necessary, vacuolate intermediate layers can be on both sides and as an additional option could be combined with vacuolate base layer.

Surprisingly, the opaque vacuolate layer prevented damage of the sealing layer during electron beam irradiation and accordingly film sealing characteristics, especially, hot tack were very good. It is possible to select surprisingly high intensity levels of irradiation and energy without damaging film hot tack characteristics.

The comparison with transparent or white films, that were only dyed with TiO2, shows that the sealing characteristics were damaged by electron beam irradiation. With the increase of energy load through electron beam irradiation the hot tack values of films were getting worse.

According to the present invention the layer that comprises minimum 40%, preferably over 50% of the total film thickness is considered to be the base layer. It is possible that the first covering layer lies directly over the base layer. There could also be a structural layout where there are further additional layers between the first sealable covering layer and the base layer which form one or several first intermediate layers. According to the present invention, covering layers are the outer layers of coextruded film. A second optional covering layer on the opposite side of the base layer can be put straight onto the base layer. Furthermore, structural layouts with both covering layers put onto the intermediate film layer are also possible. According to the present invention films can have structural layouts comprising from 2 to 7 layers. It is important that the film structure has minimum one vacuolate layer and minimum one sealable covering layer.

The opaque film used in the invention shows excellent hot tack characteristics that could not be received with transparent or white films with the comparative structural layout. In particular, it is very surprising that hot tack characteristics before and after electron beam irradiation almost stay unchanged, whereas the hot tack characteristics of transparent and white films after irradiation are distinctively worse when compared to the film prior to irradiation.

The first heat sealable, co extruded covering layer of opaque film is built up from ordinary sealable olefin polymers, for example, from ethylene or propylene polymers. In general, the sealable first covering layer contains minimum 80% by weight, preferably 85 up to < % by weight, in particular 95 to 99% by weight of the named polymers or their mixtures and standard additives where appropriate in the required quantities.

Propylene polymers are mixed polymerizates that mainly contain propylene elements. Propylene co- or terpolymers are built in general as co-monomer from at least 50% by weight of propylene and ethylene and/or butyl elements. Preferred mixed polymerizates for the sealable covering layer are static ethylene-propylene-co-polymers with ethylene content from 2 to 10% by weight, preferably 5 to 8% by weight, or static propylene-butylene-1-co-polymers with a butylene content of 4 to 25% by weight, preferably 10 to 20% by weight relative to total weight of co-polymers, or static ethylene-propylene-butylene-1-terpolymers with ethylene content from 1 to 10% by weight, preferably from 2 to 6% by weight, and butylene-1 content from 3 to 20% by weight, preferably from 8 to 10% by weight relative to total weight of terpopolymers. These co- and terpopolymers have in general a Melt Flow Index from 3 to 15 g/10 min, preferably 3 to 9 g/10 min (230.degree. C., 21.6N DIN53735) and Melt Temperature from 70 to 145.degree. C., preferably from 90 to 140.degree. C. (DSC).

Suitable polyethylene are for example HDPE, MDPE, LDPE, LLDPE, VLDPE, among which HDPE and MDPE types are especially preferred. HDPE has in general Melt Flow Index MFI (50 N/190 C) from 0.1 to 50 g/10 min, preferably 0.6 to 20 g/10 min, measured in compliance with DIN 53735, and viscosity index, measured in compliance with DIN 53728, Part 4, or ISO 1191, in the range of from 100 to 450 cm$^3$/g, preferably from 120 to 280 cm$^3$/g. Crystallinity range is from 35 to 80%, preferably from 50 to 80%. Density when measured at 23 C in compliance with DIN 53479, method A, or ISO 1183, is in the range from >0.94 to 0.96 g/cm$^3$. Melting point, measured with DSC (maximum melting curve, warming up speed 20 C/min), is in the range between 120 and 140 C. Suitable MDPE as a rule has MFI (50 N/190 C) in the range from 0.1 to 50 g/10 min, preferably from 0.6 to 20 g/10 min, measured in compliance with DIN 53735. Density when measured at 23 C in compliance with DIN 53479, method A, or ISO 1183, is in the range from >0.925 to 0.94 g/cm$^3$. Melting point, measured with DSC (maximum melting curve, warming up speed 20 C/min), is in the range between 115 and 130 C.

Along with the polymers described above, the first sealable covering layer can contain efficient quantities of standard additives such as lubricant, antistatic, anti-caking agent, stabilisers and/or neutralising agents. To improve adhesiveness or printability the surface of the first covering layer could be subjected to treatment using the known methods with Corona, flame or plasma to increase the surface tension. Typically the surface tension of the treated covering layer ranges from 35 to 45 mN/m. Preliminary treatment and addition of additives should be coordinated to avoid damage to sealing and hot tack properties.

It is fundamental to the present invention that the film should contain at least one layer and, where appropriate, several layers with vacuoles. These vacuoles give the film its opaque appearance and reduce the film density against the density of raw materials. As per present invention, 'opaque film' means vacuolate film with the highest transparency of 70% (ASTM-D 1003-77), preferably 50% at the highest.

Vacuolate layer contains polyolefin, preferably propylene polymer and vacuole initiating fillers and, where appropriate, standard additive in the efficient quantities. In general, vacuolate-containing layer has at least 70% by weight, preferably 75 to 98% by weight, of polyolefin with regard to the layer weight. In another embodiment the vacuolate layer in addition to vacuole initiating fillers can contain pigments, TiO2 in particular.

Propylene polymers are preferred for vacuolate layer as a polyolefin. These propylene polymers contain from 90 to 100% by weight, preferably 95 to 100% by weight, in particular 98 to 100% by weight propylene agents and their melting point is 120° C. or higher, preferably 150 to 170° C., and in general their Melt Flow Index is 1 to 10 g/10 min, preferably 2 to 8 g/10 min, at 230° C. and a force of 21.6 N (DIN 53735) power. Isotactic propylene homo polymer with atactic part of 15% by weight and less, copolymers of ethylene and propylene with ethylene content of 5% by weight or less, copolymer of propylene with $C_4$-$C_8$-olefins with olefin content of 5% by weight or less, ter-polymers of propylene, ethylene and butylene with ethylene content of 10% by weight or less and with butylene content of 15% by weight or less represent preferred propylene polymers for vacuolate layer, whereas isotactic propylene homo-polymer is preferred in particular. The specified percentages by weight refer to respective polymers.

The mixture of named propylene-homo and/or co-polymers and/or ter-polymers and other polyolefins, in particular from monomers with 2 to 6 C-atoms is suitable, whereas the mixture contains of at least 50% by weight, in particular at least 75% by weight of propylene polymerizate. Other suitable polyolefins in the polymer mixture are polyethylene, in particular HDPE, MDPE, LDPE, VLDPE, and LLDPE, whereas the proportion of these polyolefins relative to polymer mixture does not exceed 15% by weight.

The opaque vacuolate film layer contains max 30% by weight, preferably 2 to 25% by weight of vacuole initiating fillers relative to the weight of vacuolate layer.

According to the present invention, the vacuole initiating fillers are hard particles incompatible with polymer matrix and film drawing results in the formation of vacuolate type hollow pockets, whereas size, type and number of vacuoles depend upon the number and the size of the hard particles and drawing conditions such as draw ratio and draw temperature. Vacuoles reduce density and give the film a special perlescent opaque appearance which develops on the 'vacuole/polymer matrix' interface as a result of light diffusion. Light diffusion on the hard particles promotes in general comparatively little film opaqueness itself. As a rule, vacuole initiating fillers must be of at least 1 μm size to be effective, i.e. to result in opaqueness. In general, the average diameter of the particles is 1 to 6 μm, preferably 1 to 4 μm. Chemical characteristics of the particle play a secondary role.

Standard vacuole initiating fillers could be inorganic and/or organic and are used with polypropylene incompatible materials such as aluminium oxide, aluminium sulphate, barium sulphate, calcium carbonate, magnesium carbonate, silicates such as aluminium silicate (kaolin clay) and magnesium silicate (talcum) and siliceous dioxide, whereas calcium carbonate and siliceous dioxide are used with preference. When the organic fillers are used with the base layer polymers an issue of incompatible polymers usually arises, in particular co-polymers of cyclic olefins (COC) as described in EP-A-0623 463, polyester, polystyrene, polyamide, halogenated organic polymers, whereas polyesters, such as polybutene-terephthalate and cyclo-olefin co-polymer, are preferred. Incompatible materials or incompatible polymers, according to the present invention, means that the material, or polymer is present in the film as a separate particle or separate phase.

Vacuolate layer of another structure can contain pigments, for example, from 0.5 to 10% by weight, preferably 1 to 8% by weight, in particular 1 to 5% by weight. Data refer to the weight of vacuolate layer.

According to the present invention, pigments are incompatible particles which do not essentially lead to vacuolate formation during film stretching. The colouring effect of the pigments is initiated by the particles themselves. Definition 'pigment' is in general connected with a medium diameter of a particle in the range of 0.01 to max 1 μm and refers to the so called 'white pigments' which give a white colour to films, and 'coloured pigments' which give different colours to films, including black. In general, the medium particle diameter of pigments is in the range from 0.01 to 1 μm, preferably 0.01 to 0.7 μm, predominantly 0.01 to 0.4 μm.

Usually pigments are such materials as, for example, aluminium oxide, aluminium sulphate, barium sulphate, calcium carbonate, magnesium carbonate, silicates—such as aluminium silicate (Kaolin-clay) and magnesium silicate (talcum), silica dioxide and titanium dioxide, whereas white pigments such as calcium carbonate, silica dioxide, titanium dioxide and barium sulphate are used preferably. Titanium dioxide is especially preferred. Different modifications and coatings of $TiO_2$ are known in the prior art.

Film density is mainly determined by the density of vacuolate layer. Density of vacuolate layer shall be generally reduced by vacuoles, provided higher quantities of $TiO_2$ do not compensate density reducing effect of the vacuoles. In general, the density of the opaque vacuolate layer is in the range from 0.45-0.85 g/cm$^3$. Film density depending on the various film structures has a large variation range and in general is from 0.5 to 0.95 g/cm$^3$, preferably 0.6 to 0.9 g/cm$^3$. Principally, density is increased by addition of $TiO_2$, but it is decreased simultaneously through vacuole initiating fillers in the vacuolate layer. Density of opaque vacuolate layer which does not contain density increasing $TiO_2$ is preferably in the range of 0.45 to 0.75 g/cm$^3$, whereas preferred density for white-opaque vacuole containing layer with $TiO_2$ is in the range from 0.6 to 0.9 g/cm$^3$.

In general, it is preferred that the vacuole containing layer described above is the base layer of the film and then shows a thickness of at least 10 to 80 μm, preferably 10 to 60 μm.

Alternatively, the vacuolate layer could be an intermediate layer or the film, in addition to vacuolate base layer, has one or two vacuolate layers. In general, the thickness of an intermediate vacuolate layer is at least 5 μm, preferably 7 to 15 μm.

Total film thickness is in general in the range between 20 and 100 μm, preferably 25 to 60 μm predominantly from 30 to 50 μm.

Preferred structure is the one where the film has another additional layer or layers which does/do not contain vacuoles. This additional layer/s could be a second covering layer and/or first or second additional intermediate layer. In a particular case, where there are two vacuolate intermediate layers an additional vacuole free layer could also be a base layer of the film. Structure and composition of the additional layer or layers will depend upon the desired functionality that the film should possess. The thickness of the additional layer, being a second covering layer, normally is in the range between 0.5 and 3 μm, the thickness of additional intermediate non-vacuolate layers is normally in the range between 1 and 8 μm.

Additional non-vacuolate layer/s have in general at least 80% by weight, preferably 90 to <100% by weight of olefin polymer or their mixtures. Suitable polyolefins are for example polyethylene, propylene co-polymers and/or propylene ter-polymers, as well as propylene homo-polymer already described above in connection with vacuolate layer and, where appropriate, standard additives.

Suitable propylene-co or ter-polymers are in general structured from at least 50% by weight of propylene and ethylene and/or butylenes' particles as co monomer. The preferred mixed polymer (copolymer) are static ethylene-propylene-copolymers with ethylene content in the range between 2 and 10% by weight, preferably between 5 and 8% by weight, or static propylene-butene-1 copolymer with butene content in the range between 4 and 25% by weight, preferably between 10 and 20% by weight of total copolymer weight, or static ethylene-propylene-butene-1-terpolymere with ethylene content in the range between 1 and 10% by weight, preferably between 2 and 6% by weight, and butene-1 content in the range between 3 and 20% by weight, preferably between 8 and 10% by weight of ter-polymer total weight. Melt Flow Index of these co and ter-polymer is in the range between 3 and 15 g/10 min, preferably between 3 and 9 g/10 min (230° C., 21, 6N DIN 53735) and melting point in the range between 70° C. and 145° C., preferably between 90 and 140° C. (DSC).

Suitable polyethylene types are, for example, HDPE, MDPE, LDPE, LLDPE, VLDPE, whereas HDPE and MDPE are especially preferred types. Melt Flow Index (MFI) (50N/190 C) of HDPE is in the range between 0.1 and 50 g/10 min, preferably between 0.6 and 20 g/10 min, measured in compliance with DIN 53 735 and viscosity factor in the range between 100 and 450 cm$^3$/g, preferably between 120 and 280 cm$^3$/g measured as per DIN 53728, Part 4, or ISO 1191. Crystallinity is in the range between 35 and 80%, preferably between 50 and 80%. Density is in the range between from >0.94 to 0.96 g/cm$^3$ measured at 23 C in compliance with DIN 53479, Method A, or ISO 1183. Melting point, measured with DSC (melting curve maximum, warming up speed 20

C/min), is in the range between 120 and 140 C. Suitable MDPE has a Melt Flow Index (MFI) (50N/190 C) in the range from 0.1 to 50 g/10 min, preferably 0.6 to 20 g/10 min, measured as per DIN 53 735. Density, measured at 23 C as per DIN 53479, Method A, or ISO 1183, is in the range from >0.925 to 0.94 g/cm$^3$. Melting point, measured with DSC (melting curve maximum, warming up speed 20 C/min), is in the range between 115 and 130° C.

To improve optics, especially whiteness grade, it is possible to use additional non-vacuolate layer/s that were described above and used for the pigments of the base layer, in particular TiO2 in the quantity from 2 to 12 weight %, preferably from 3 to 8% by weight of the layer weight.

As it was mentioned before, all film layers contain predominantly neutralising agent and stabilisers in the effective quantities, as well as, where appropriate, additional additives, such as lubricant, antistatic, or anti-caking agent.

Regular stabilising compounds could be used for Ethylene-, propylene and other olefin polymers in the range between 0.05 and 2% by weight. Especially suitable are phenol stabilisers, alkali-/alkali-earth stearates and/or alkali-/alkali-earth carbonates. Phenol stabilisers in the range from 0.1 to 0.6% by weight, predominantly from 0.15 to 0.3% by weight, having molar mass higher than 500 g/mol, are preferred.

Neutralising substances are mainly calcium stearate and/or calcium carbonate and/or synthetic dihydrotalcite (SHYT) with an average particle having the highest size of 0.7 μm, absolute particle having minimum size of 10 μm and specific surface of at least 40 m$^2$/g. In general, neutralising substance is used in the range from 50 to 1000 ppm of the layer.

Suitable anti-caking substances are non-organic additives such as silica dioxide, calcium carbonate, magnesium silica, aluminium silica, calcium phosphate and similar and/or incompatible polymerizates such as polymethyl methacrylate (PMMA) polyamides, polyester, polycarbonates, and similar, preferred are polymethylmethacrylate (PMMA), silica dioxide and calcium carbonate. The effective quantity of anti-caking substance is in the range from 0.1 to 2% by weight, preferably 0.1 to 0.5% by weight of the respective covering layer. Mean particle size is between 1 and 6 μm, in particular 2 and 5 μm, in which particles of spherical shape, as described in EP-A-0236945 and DE-A-38 01 535 are especially suitable.

According to the present invention the above described film goes through the appropriate treatment process where electron beam hardening is used. The film, for example, could be printed, layers pasted together, laminated, varnished, layered or a special glue for cold sealing could be applied. If necessary, these treatment methods could be combined, for example, after printing a varnish could be applied for finishing. During these treatments the additional layers or films are laid on the first sealable covering layer. Drying or hardening of glue, varnish or surface coating is carried out with the use of electron beam hardening method.

Treated film could be used as sealable film to manufacture packaging. Notwithstanding drying or hardening using electron beam irradiation, the film preserves excellent sealing properties and perfect t hot tack characteristics which are very important when filling plastic bags with sealable edge.

Suitable electron beam irradiation hardening methods are known and are described in the following symposium catalogue: I. Rangwalla ESI US Wilmington 'Influence of Electron Beam on some Polymeric Substrates used in Flexible Packaging', 29$^{th}$ Munich Symposium on Glues and Improvements in 2004 (pages: 7-13; 24-28; 29-34; 51-52;113-116; 187-195).

The invention further refers to a method of multi-layer film manufacturing using a known co-extrusion technology, in which Stenter technology is of preference.

As per this technology, melts matching separate film layers are co-extruded through a die head, then the film is transferred to hardening through one or several rollers, and finally stretched, the stretched film is further heat-set and, if appropriate, transferred to treatment of the covering layer by plasma-corona or flame.

As in the extrusion technology, polymer or polymer mixture of individual layers is usually compacted and liquefied in the extruder, whereas vacuole initiating fillers and, where appropriate, other additives that could already be present in polymer or polymer mixture. Alternatively, these additives could also be introduced through a master batch.

The melts jointly and simultaneously are pressed through the die head (flat die), then the multilayered film is drawn through one or several calenders at the temperature from 5 to 100° C., preferably between 10 and 50° C., whereas it cools and hardens.

Film obtained using the above method is then drawn lengthwise and crosswise using the extruder which results in orientation of the molecule chains. Drawing lengthwise is carried out at a temperature from 80 to 150° C. and it is advisable to carry out this drawing with the help of twin high speed rollers in compliance with the increased draw ratio and it is preferred to carry out crosswise drawing at a temperature between 120 and 170° C. using an appropriate tenter. Lengthwise draw ratio is in the range between 4 and 8, preferably between 4.5 and 6. Crosswise draw ratio is in the range between 5 and 10, preferably between 7 and 9.

Film heat stabilization (heat treatment) is carried out on completion of drawing whereas the film is kept under temperature between 100 and 160° C. during ca 0.1 to 10 s. Then the film is rewind using a regular rewinding device.

It is preferred to carry out known plasma, corona or flame treatments of one or both film surfaces after biaxial drawing. Treatment intensity is in the range between 35 and 50 mN/m, in particular from 39 to 40 mN/m.

For evaluation of raw materials and films the following measuring methods were used:

Melt Flow Index

Melt Flow Index was measured in compliance with DIN 53 735 at 21.6 N load and at 230° C. temperature.

Density

Density was established in compliance with DIN 53 479, Method A.

Surface Tension

Surface tension was established using ink method in compliance with DIN 53 364.

Hot Tack

'Hot Tack' shows the strength of a sealed joint when it is still hot, immediately after the sealing device is opened. To establish hot tack there were two film cuts of 530 mm laid on the top of each other and the edges were fixed with a bracket G of 100 g. A flat spatula is inserted between the film layers and a measuring strip is inserted over two guide rollers between sealing clamps. Then, the sealing was separated and spatula pulled out immediately after the sealing clamps were closed. Sealing conditions were set as follows: sealing temperature—150° C., sealing time—0.5 s, application pressure—30 N/cm2. On expiration of 0.5 s—sealing time, sealing clamps open (area: 20 cm2) automatically, and the sealed measuring strips are jerked out through load to the guide roller and then separated under 180° angle. Hot tack is given as delaminating depth of a sealing joint in mm that occurs at specifically applied strength.

From now on the invention shall be explained based on the following examples.

Example 1

After co-extrusion method a five layer half-finished film was extruded through the slot die at an extrusion temperature from 240 to 270° C. This half-finished film then was pulled onto a cooling roller to cool. Finally, the half-finished film was drawn lengthwise and crosswise and then fixed. The surface of the second covering layer was preliminarily treated through corona to increase the surface tension. Five-layered film has the following structure: first covering layer/first intermediate layer/base layer/second intermediate layer/second covering layer. Film layers have the following composition:

First covering layer (0.5 μm):
99.7% by weight propylene-butene-co-polymerizate with a butene proportion of 4% by weight (of co-polymer) and melting point of 136° C.; Melt Flow Index of 7.3 g/10 min at 230° C. and load of 2.16 kg (DIN 53 735).
0.1% by weight anti-caking agent with a mean particle diameter of ca 4 μm (Sylobloc 45).

First Intermediate Layer (0.5 μm)
~100% by weight propylene homo-polymerizate (PP) with n-heptane dissoluble proportion of ca 4% by weight (of 100% PP) and melting point of 163° C.; and Melt Flow Index of 3.3 g/10 min at 230° C. and 2.16 kg load (DIN 53 735).

Base Layer: (29.5 μm)
91.6% by weight-propylene homo-polymerizate (PP) with n-heptane dissoluble proportion of ca 4% by weight (of 100% PP) and melting point of 163° C.; and Melt Flow Index of 3.3 g/10 min at 230° C. and 2.16 kg load (DIN 53735).
6.0% by weight of calcium carbonate, particle mean diameter of ca 2.7 μm
2.4% by weight of titanium dioxide, particle mean diameter of ca 0.1 to 0.3 μm Second Intermediate Layer (4 μm)
96.4% by weight—propylene homo-polymerizate (PP) with n-heptane dissoluble proportion of ca 4% by weight (of 100% PP) and melting point of 163° C.; and Melt Flow Index of 3.3 g/10 min at 230° C. and 2.16 kg load (DIN 53735) and
3.6% by weight of titanium dioxide, particle mean diameter of ca 0.1 to 0.3 μm Second Covering Layer (0.1 μm).
99.7% by weight of ethylene propylene co-polymerizate with ethylene proportion of 4% by weight (of co-polymer) and melting point of 163° C.; and Melt Flow Index of 7.3 g/10 min at 230° C. and 2.16 kg load (DIN 53735) and 64.7 J/kg—energy required to liquefy.
0.1% by weight of anti-caking agent with the particle mean diameter of ca 4 μm (Sylobloc 45).

All film layers contained additionally stabilizing and neutralizing agents in standard quantities.

There were the following conditions and temperatures selected for film production:
Extrusion: Extrusion temperature ca 250-270° C.
Cooling roller: Temperature 30° C.
Drawing lengthwise: T=120° C.
Drawing lengthwise factor 5
Drawing crosswise: T=160° C.
Drawing crosswise factor 9
Curing Temperature=100° C.

Second covering layer of the film was treated on its surface with corona and showed surface tension of 38 mN/m. Film showed density of . . . , thickness of 40 μm and opaque appearance.

Comparison Example 2

Opaque film was made as per Example 1. As compared to Example 1 the difference was that there was no CaCO3 added to the base layer, and the proportion of propylene polymer increased accordingly. Film density was 0.96 cm$^3$; thickness 30 μm and appearance white.

Comparison Example 3

A film was produced as described in Example 1. As compared to Example 1 there were no TiO2 or CaCO3 added to any of the layers. A transparent film of 0.9 g/cm$^3$ density was produced using this method.

Surfaces of the second covering layer of all films produced as per examples and comparison examples were finished with a thinning agent-free coat that was hardened using electron beam irradiation. Electron irradiation was carried out by stages with the dose increasing from 5 to 30 kGy. Then hot tack and sealing of the first covering layers was arranged under temperature from 89 to 140° C.

It proved that hot tack characteristics of only opaque films with vacuoles remain almost unchanged. Only a marginal deterioration of hot tack occurs when the dose is increased. White or transparent films after VB2 and VB3 with increased film load and at increased sealing temperatures show further increase of hot tack deterioration. Thus, opaque film according to the invention could be used in many different ways in EBI method without hot tack deterioration. The film, after electron irradiation treatment, could be further sealed under very high temperature range of 90-140° C. and shows stable and good hot tack characteristics. Sealing layer of transparent and white films is damaged by irradiation. This deterioration is increased with the increase of electron irradiation intensity, so that these films could either be irradiated with low energy electrons or very limited timeframes must be accepted. The film shows acceptable hot tack characteristics only when the sealing temperature is ca 120° C. and is only a little damaged as compared to untreated films.

The invention claimed is:

1. A method comprising:
    providing a co-extruded, multilayer, and biaxially-oriented polypropylene film comprising:
        (A) at least one first heat sealable covering layer comprising at least 80% by weight of an ethylene polymer, a propylene polymer, or a mixture thereof; and
        (B) at least one vacuolate layer comprising at least one propylene polymer having a thickness of at least 5 μm;
    irradiated the co-extruded, multilayer, and biaxially-oriented polypropylene film with electrons on the side opposing said at least one first heat sealable covering layer;
    wherein the at least one first sealable covering layer has a Hot Tack value, wherein the Hot Tack value after irradiation with electrons is less than or equal to 10% below the Hot Tack value before irradiation with electrons and is capable of.

2. The method of claim 1 further comprising laminating or pasting the co-extruded, multilayer, and biaxially-oriented polypropylene film to another film prior to irradiation.

3. The method of claim 1 further comprising coating, varnishing, and/or printing the co-extruded, multilayer, and biaxially-oriented polypropylene film prior to irradiation.

4. A method comprising
    (1a) laminating or pasting a co-extruded, multilayer, and biaxially-oriented polypropylene film, wherein said film comprises (A) at least one first heat sealable covering layer comprising at least 80% by weight of an ethylene polymer, a propylene polymer, or a mixture thereof and (B) at least one vacuolate layer comprising at least one propylene polymer having a thickness of at least 5 µm, with another film, and/or (1b) coating, varnishing, and/or printing said co-extruded, multilayer, and biaxially-oriented polypropylene film, wherein said co-extruded, multilayer, and biaxially-oriented polypropylene film is laminated or pasted with another film and/or coated, varnished, and/or printed on the side opposite said at least one first heat sealable covering layer, and (2) irradiating the resulting co-extruded, multilayer, and biaxially-oriented polypropylene film laminated or pasted with another film and/or coated, varnished, and/or printed co-extruded, multilayer, and biaxially-oriented polypropylene film with electrons on the side opposing said at least one first sealable covering layer.

5. The method of claim 4, wherein said at least one first heat sealable covering layer has a Hot Tack value, wherein the Hot Tack value after irradiation with electrons is less than or equal to 10% below the Hot Tack value before irradiation with electrons.

6. A method comprising:

providing a co-extruded, multilayer, and biaxially-oriented polypropylene film comprising:

(A) at least one first sealable covering layer comprising at least 80% by weight of an ethylene polymer, a propylene polymer, or a mixture thereof; and (B) at least one vacuolate layer comprising at least one propylene polymer having a thickness of at least 5 µm;

(1a) laminating or pasting the co-extruded, multilayer, and biaxially-oriented polypropylene film to another film; and/or (1b) coating, varnishing, and/or printing the co-extruded, multilayer, and biaxially-oriented polypropylene film, wherein said co-extruded, multilayer, and biaxially-oriented polypropylene film is laminated or pasted with another film and/or coated, varnished, and/or printed on the side opposite said at least one first sealable covering layer, and (2) irradiating the resulting co-extruded, multilayer, and biaxially-oriented polypropylene film laminated or pasted with another film and/or coated, varnished, and/or printed co-extruded, multilayer, and biaxially-oriented polypropylene film with electrons on the side opposing said at least one first sealable covering layer;

wherein the at least one first sealable covering layer has a Hot Tack value, wherein the Hot Tack value after irradiation with electrons is less than or equal to 10% below the Hot Tack value before irradiation with electrons.

* * * * *